(12) United States Patent
Okesaku et al.

(10) Patent No.: US 11,945,513 B2
(45) Date of Patent: Apr. 2, 2024

(54) VEHICLE BODY STRUCTURE

(71) Applicant: SUBARU CORPORATION, Tokyo (JP)

(72) Inventors: Yasuaki Okesaku, Tokyo (JP); Masato Nakamura, Tokyo (JP); Takayoshi Inoue, Tokyo (JP); Koichi Mashiko, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 86 days.

(21) Appl. No.: 17/703,669

(22) Filed: Mar. 24, 2022

(65) Prior Publication Data
US 2022/0348266 A1 Nov. 3, 2022

(30) Foreign Application Priority Data
Apr. 28, 2021 (JP) .................. 2021-076186

(51) Int. Cl.
*B60N 2/015* (2006.01)
*B62D 25/20* (2006.01)
*B62D 27/02* (2006.01)

(52) U.S. Cl.
CPC ........... *B62D 25/20* (2013.01); *B62D 27/023* (2013.01); *B60N 2/015* (2013.01)

(58) Field of Classification Search
CPC ...... B62D 25/20; B62D 27/023; B60N 2/015; B60N 2/4263; B60N 2/012; B60N 2/42718
USPC ............... 296/193.07, 68.1, 187.12
See application file for complete search history.

(56) References Cited

U.S. PATENT DOCUMENTS

| 6,203,099 | B1 * | 3/2001 | Iwatsuki | B62D 21/152 296/204 |
|---|---|---|---|---|
| 6,834,912 | B2 * | 12/2004 | Cardimen | B62D 21/157 296/29 |
| 8,006,985 | B2 * | 8/2011 | Facey | B62B 5/0093 280/43.24 |
| 8,033,602 | B2 * | 10/2011 | Yamaki | B60N 2/4249 297/216.13 |
| 11,820,267 | B2 * | 11/2023 | Kadam | B60N 2/0244 |
| 2002/0153749 | A1 * | 10/2002 | Lee | B62D 25/20 296/204 |
| 2003/0025365 | A1 * | 2/2003 | Sato | B60N 2/2893 297/216.1 |
| 2012/0049603 | A1 * | 3/2012 | Ellison | B60N 2/42718 297/452.48 |

(Continued)

FOREIGN PATENT DOCUMENTS

JP H05-1349 U 1/1992
JP 2007284003 A * 11/2007

(Continued)

*Primary Examiner* — Pinel E Romain
(74) *Attorney, Agent, or Firm* — MCGINN I.P. LAW GROUP, PLLC

(57) ABSTRACT

A vehicle body structure provided on a vehicle includes a floor pan and a bracket. On an upper surface of the floor pan, a cushion of a seat on which an occupant of the vehicle is to be seated is to be disposed. A bracket is disposed on an outer end side of a seating position for the occupant in a vehicle width direction of the vehicle on the upper surface of the floor pan, and includes at least one protruding portion protruding upward and extending in a front-rear direction.

17 Claims, 5 Drawing Sheets

(56) References Cited

U.S. PATENT DOCUMENTS

2014/0361520 A1 * 12/2014 Hirako ............... B60N 2/42763
 280/729

FOREIGN PATENT DOCUMENTS

| JP | 2009280050 A | * | 12/2009 | ............. B60N 2/012 |
| JP | 2015217758 A | * | 12/2015 | |
| JP | 2021049963 A | * | 4/2021 | ............... B60N 2/42 |

* cited by examiner

VEHICLE BODY STRUCTURE

CROSS-REFERENCE TO RELATED APPLICATIONS

The present application claims priority from Japanese Patent Application No. 2021-076186 filed on Apr. 28, 2021, the entire contents of which are hereby incorporated by reference.

BACKGROUND

The disclosure relates to a vehicle body structure including a floor pan on an upper surface of which a cushion of a seat on which an occupant is to be seated is disposed.

As a vehicle body structure of this type, there has been proposed a vehicle body structure in which a recessed portion is provided in a bottom portion of a cushion body, and a hip movement preventing body that fits the recessed portion is provided on a floor pan (see, for example, Japanese Unexamined Utility Model (Registration) Application Publication (JP-UM-A) No. H5-1349). In the vehicle body structure of JP-UM-A No. H5-1349, the hip movement preventing body extending laterally is disposed in front of a hip support of the cushion body, thereby preventing a forward movement of a hip of the seated occupant during a frontal collision of the vehicle.

SUMMARY

An aspect of the disclosure provides a vehicle body structure provided on a vehicle. The vehicle body structure includes a floor pan and a bracket. On an upper surface of the floor pan, a cushion of a seat on which an occupant of the vehicle is to be seated is to be disposed. A bracket is disposed on an outer end side of a seating position for the occupant in a vehicle width direction of the vehicle on the upper surface of the floor pan, and includes at least one protruding portion protruding upward and extending in a front-rear direction.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the vehicle body structure described in JP-UM-A No. H5-1349, the hip movement preventing body is located below a center of an occupant in the lateral direction, a distance between the hip movement preventing body and a lateral center of the hip of the occupant may not be maintained, and the riding comfort of the occupant is greatly impaired.

It is desirable to provide a vehicle body structure that can restrain a movement of an occupant with respect to a vehicle body during a vehicle collision or the like without impairing the riding comfort of the occupant.

In the following, an embodiment of the disclosure is described in detail with reference to the accompanying drawings.

Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
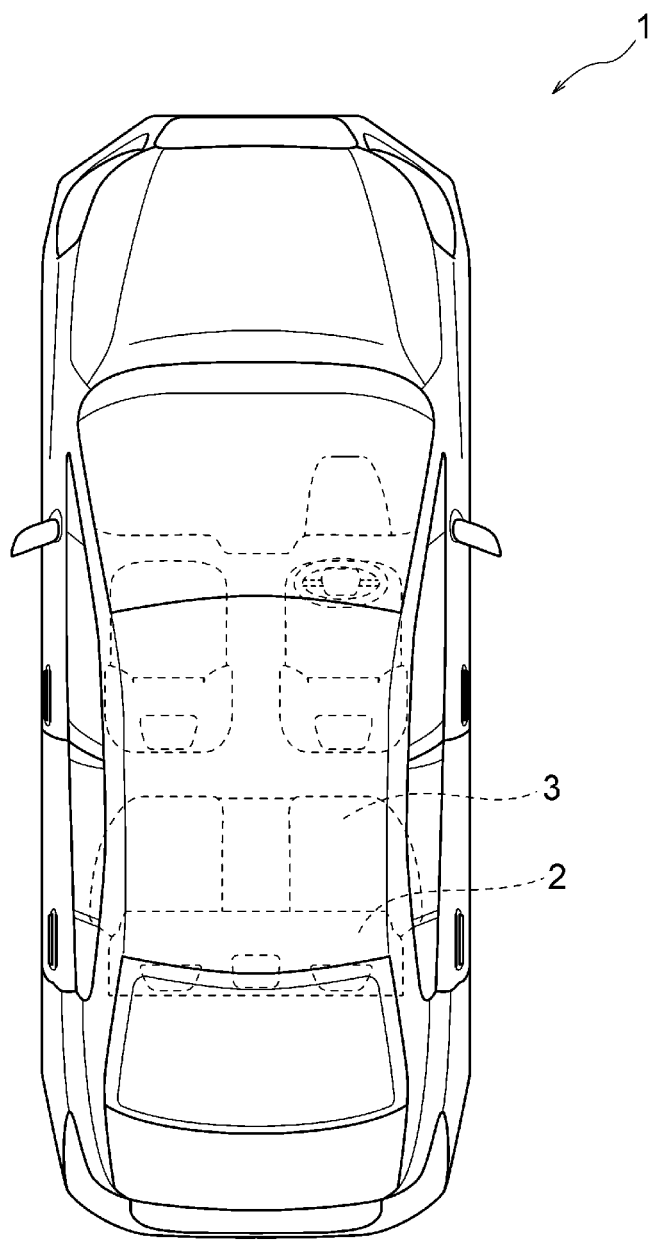
FIG. 1 is a schematic top view illustrating a vehicle according to an embodiment of the disclosure.
Figure 2:
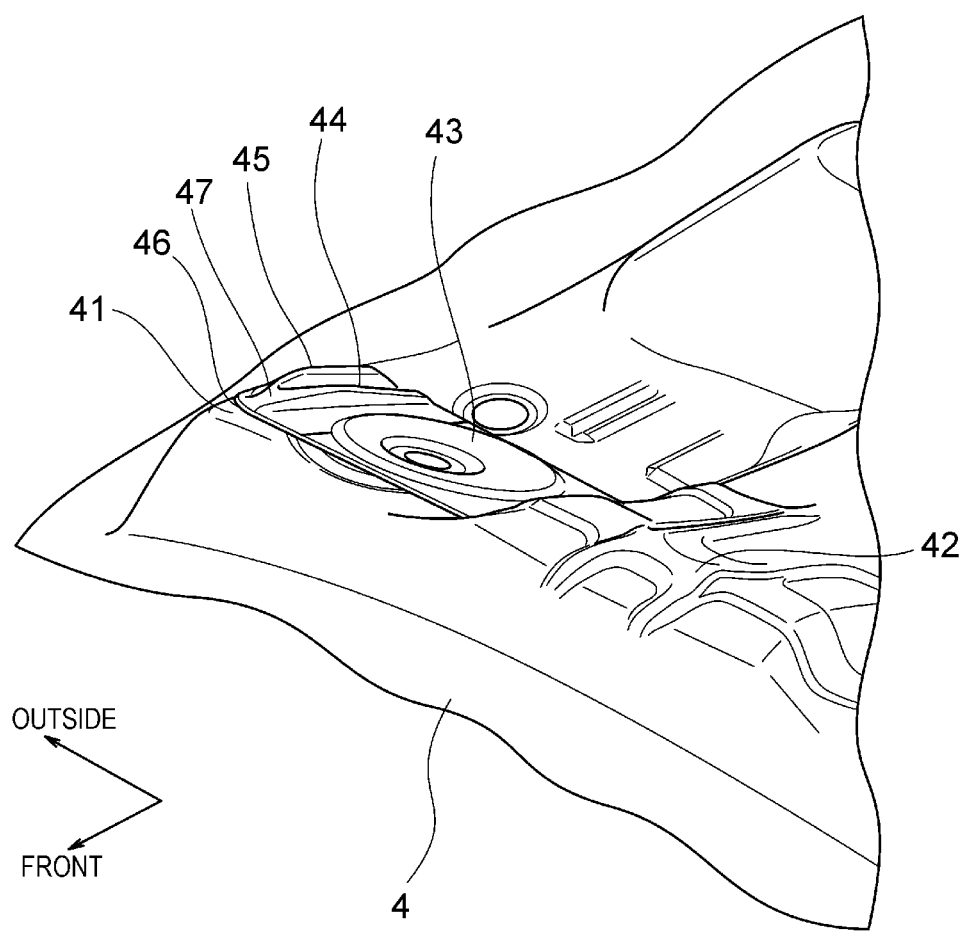
FIG. 2 is a partial perspective view illustrating a vehicle body structure.
Figure 3:
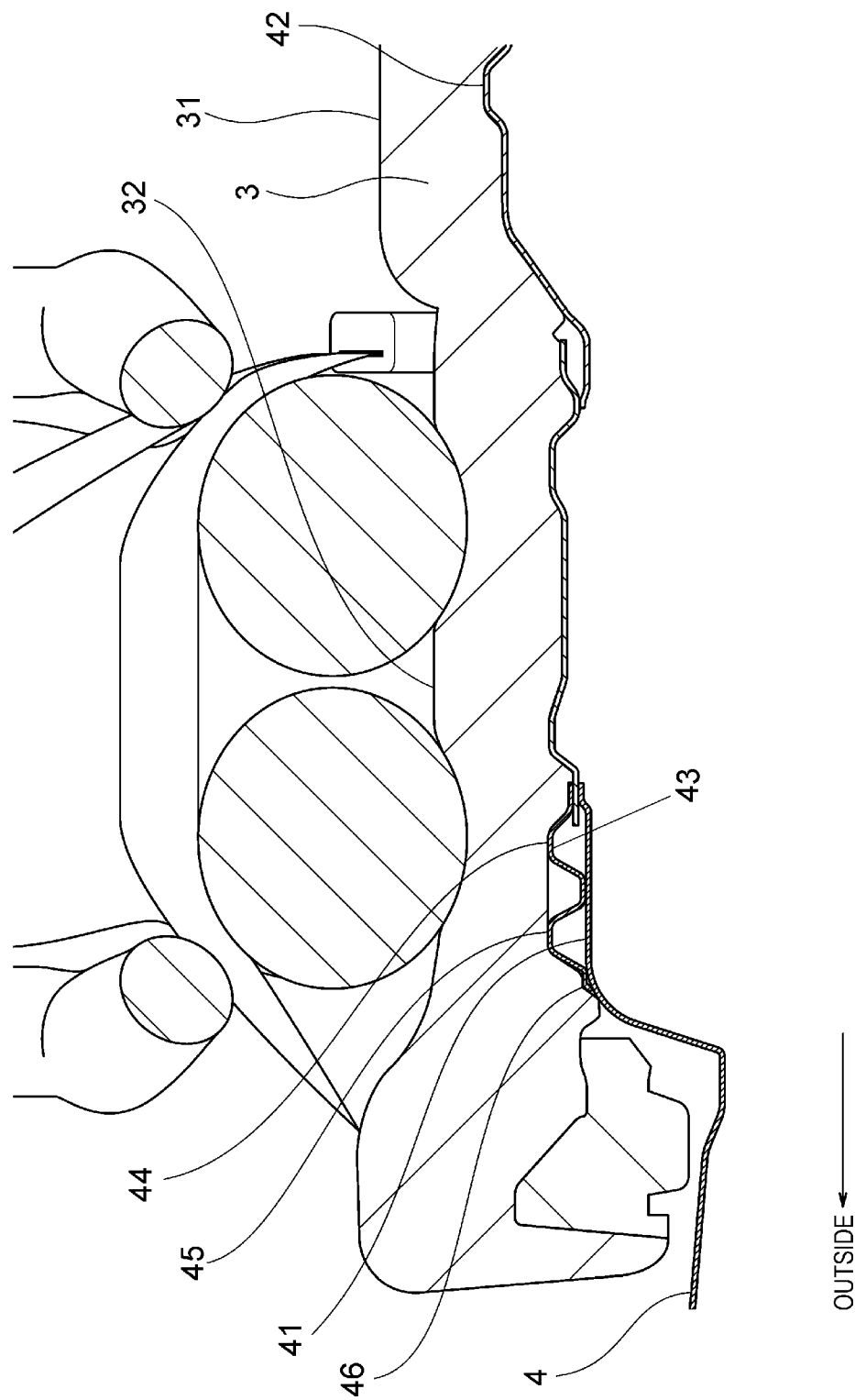
FIG. 3 is a partial front cross-sectional view illustrating the vehicle body structure when an occupant is seated on a cushion.
Figure 4:
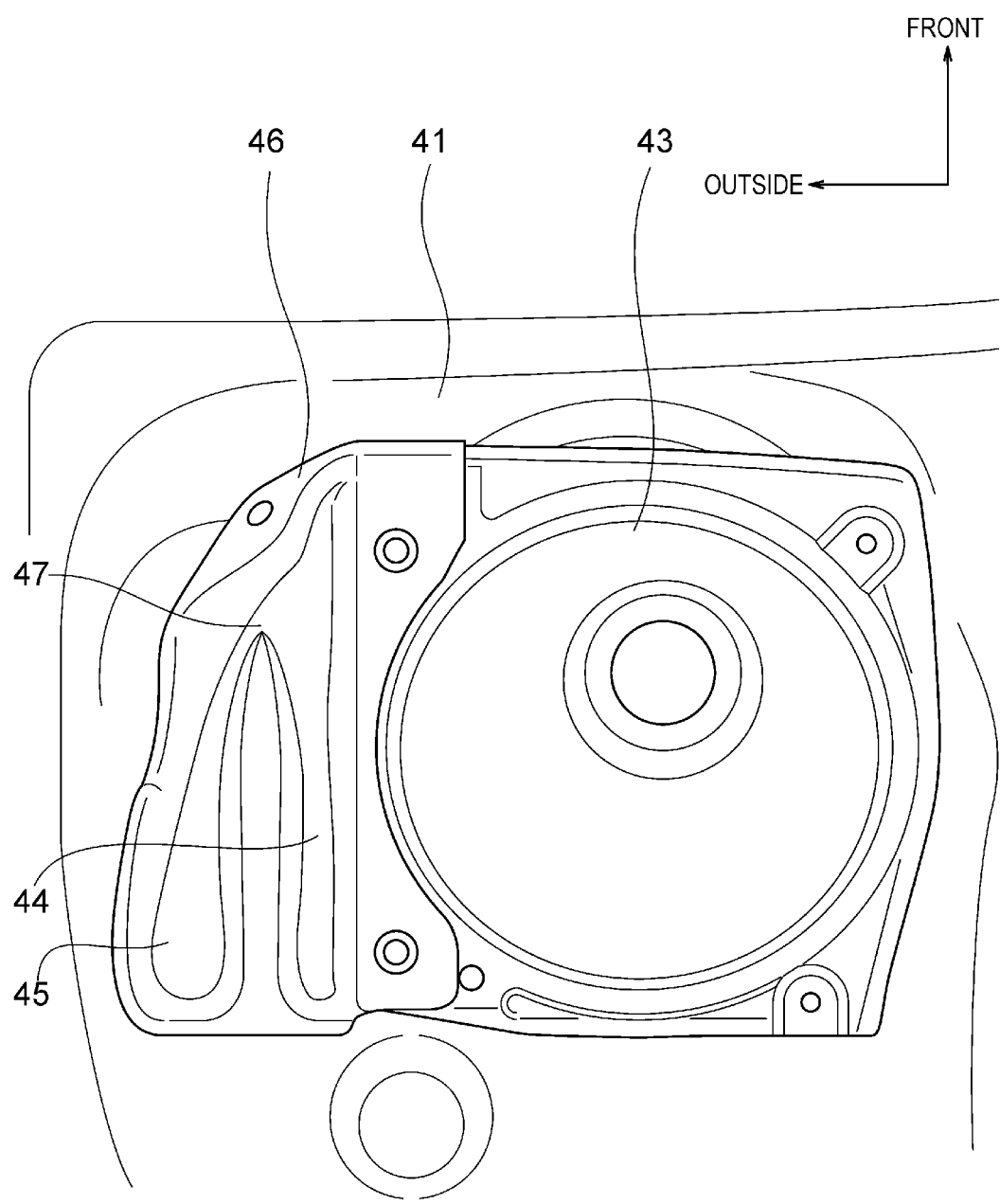
FIG. 4 is a partial top view of the vehicle body structure.

FIGS. 1 to 4 illustrate the embodiment of the disclosure. FIG. 1 is a schematic top view of a vehicle. FIG. 2 is a partial perspective view of a vehicle body structure. FIG. 3 is a partial front cross-sectional view illustrating the vehicle body structure when an occupant is seated on a cushion. FIG. 4 is a partial top view of the vehicle body structure.

As illustrated in FIG. 1, a vehicle 1 includes a seat 2 in the vehicle cabin space. In the present embodiment, the seat 2 serving as a rear seat includes a cushion 3 that forms a seating surface for an occupant. The cushion 3 may be made of any material, and may be made of, for example, a plastic material such as urethane foam.

As illustrated in FIG. 2, a vehicle body structure of the vehicle 1 includes a floor pan 4 that forms a floor portion of a vehicle body. The floor pan 4 includes a first stepped bulging portion 41 that bulges upward toward the center in a vehicle width direction, and the cushion 3 is disposed on an upper surface of the first stepped bulging portion 41. A second stepped bulging portion 42 that bulges upward toward the center in the vehicle width direction is formed on the first stepped bulging portion 41.

As illustrated in FIG. 3, the cushion 3 covers the first stepped bulging portion 41 in the vehicle width direction. An upper surface 31 of the cushion 3 has a seating surface 32 that is formed to be lower than the other portions and on which an occupant is to be seated. In the present embodiment, the seating surface 32 is formed over the first stepped bulging portion 41 excluding the second stepped bulging portion 42 in the vehicle width direction.

As illustrated in FIG. 3, the floor pan 4 includes a cover member 43 that closes an opening 41 formed in the first stepped bulging portion 41. In the present embodiment, the opening 41 is formed for various devices of a fuel system disposed under the floor pan 4. A bracket 46 including protruding portions 44 and 45 protruding upward is disposed on an outer side of the cover member 43 in a width direction thereof on the upper surface of the first stepped bulging portion 41. The bracket 46 is disposed on an outer end side of a seating position of an occupant in the vehicle width direction. The cover member 43 and the bracket 46 are fixed to the floor pan 4, for example, by fasteners such as bolts and nuts. The floor pan 4, the cover member 43, and the bracket 46 are made of metal. In the present embodiment, these components are made of steel plates.

As illustrated in FIG. 4, the bracket 46 includes the plurality of protruding portions 44 and 45 extending in a front-rear direction. The protruding portions 44 and 45 are adjacent in the vehicle width direction. A first protruding portion 44 on an inner side in the vehicle width direction extends further forward than a second protruding portion 45 on an outer side in the vehicle width direction.

The bracket 46 includes a connecting portion 47 formed between the adjacent protruding portions 44 and 45 so as to be continuous with the protruding portions 44 and 45, and connecting the protruding portions 44 and 45. In the present embodiment, the connecting portion 47 connects a front end of the second protruding portion 45 and a predetermined position of the first protruding portion 44 in the front-rear direction. The second protruding portion 45 is formed such that a width thereof increases rearward, and the strength of the second protruding portion 45 increases toward the rear end thereof.

According to the vehicle body structure configured described above, a movement around the pelvis of an occupant toward an outer side in the vehicle width direction with respect to the vehicle body during a vehicle collision or the like is significantly restrained by the protruding portions 44, 45 of the bracket 46 extending in the front-rear direction. A movement around the pelvis of the occupant toward an inner side in the vehicle width direction is restrained by the second stepped bulging portion 42. As a result, the amount of deviation of a restraint position of a seatbelt relative to an occupant from a desired position can be reduced, and an injury value from the seatbelt to the occupant can be reduced. Since the bracket 46 is disposed on the outer end side in the vehicle width direction of the seating position of the occupant, a constant distance between the protruding portions 44 and 45 of the bracket 46 and a center of a hip of the occupant in the vehicle width direction can be maintained. Therefore, the riding comfort of the occupant is not impaired by the protruding portions 44 and 45 of the bracket 46.

By providing the plurality of the protruding portions 44 and 45, the resistance against a load from an occupant during a vehicle collision or the like can be increased. By connecting the protruding portions 44, 45 by the connecting portion 47, bending between the protruding portions 44, 45 of the bracket 46 when a load acts on the protruding portions 44, 45 from an occupant can be prevented.

Figure 5:
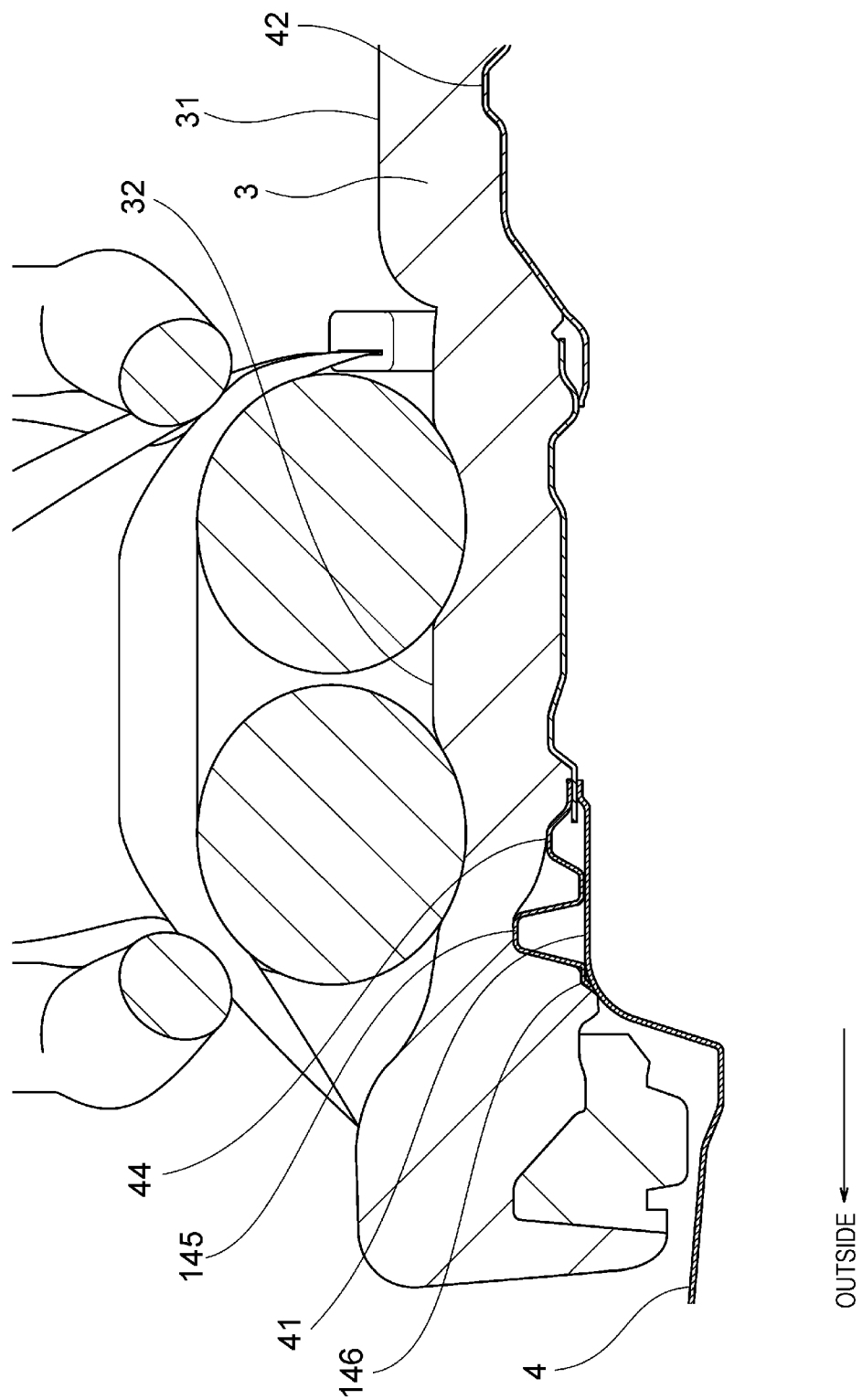
FIG. 5 is a partial front cross-sectional view illustrating a vehicle body structure according to a modification.

In the above-described embodiment, upward protrusion amounts of the protruding portions 44 and 45 are illustrated to be substantially the same, but, for example, as illustrated in FIG. 5, the protruding portions may be formed such that the more outward in the vehicle width direction the protruding portions are, the larger an upward protrusion amount thereof is. In a bracket 146 of FIG. 5, a second protruding portion 145 on the outer side in the vehicle width direction is formed to be higher than the first protruding portion 44 on the inner side in the vehicle width direction. According to the vehicle body structure, the strength of the protruding portion 145 on the outer side in the vehicle width direction is increased, and when an occupant moves to the outer side in the vehicle width direction during a vehicle collision or the like, the pelvis of the occupant can be reliably pressed by the second protruding portion 145.

In the above-described embodiment, only the second protruding portion 45 is formed such that the width thereof increases rearward, but the first protruding portion 44 may also be formed such that the width thereof increases rearward. Although it is illustrated that two protruding portions 44 and 45 are provided, the number of protruding portions may be any number, and may be three or more, or may be one. In a case where three or more protruding portions are provided, at least one connecting portion connecting the adjacent protruding portions is provided. In a case where three or more protruding portions are provided, the protruding portion is formed such that the more outward in the vehicle width direction the protruding portions are, the larger the upward protrusion amount thereof is.

Although the embodiment of the disclosure has been described above, the embodiment described above does not limit the disclosure according to the claims. It is also noted that not all the combinations of the features described in the embodiment are necessary for a solution to a problem of the disclosure.

According to the vehicle body structure of the present embodiment, a movement around the pelvis of an occupant to an outer side in the vehicle width direction with respect to a vehicle body during a vehicle collision or the like is significantly restrained by the protruding portion of the bracket extending in the front-rear direction. Accordingly, a forward movement of the occupant with respect to the vehicle body is also restrained. As a result, the amount of deviation of a restraint position of a seatbelt relative to an occupant from a desired position can be reduced, and an injury value from the seatbelt to the occupant can be reduced. Since the bracket is disposed on the outer end side in the vehicle width direction of the seating position of the occupant, a constant distance between the protruding portion of the bracket and a center of a hip of an occupant in the vehicle width direction can be maintained. Therefore, the riding comfort of an occupant is not impaired by the protruding portion of the bracket.

According to the vehicle body structure of the present embodiment, since the protruding portion is formed such that the width thereof increases rearward, the strength of the protruding portion increases toward the rear end thereof.

According to the vehicle body structure of the present embodiment, by providing a plurality of protruding portions, the resistance against a load from an occupant during a vehicle collision or the like can be increased.

According to the vehicle body structure of the present embodiment, by connecting the protruding portions by the connecting portion, bending between the protruding portions of the bracket when a load acts on the protruding portions from an occupant can be prevented.

According to the vehicle body structure of the present embodiment, a protruding portion on the outer side in the vehicle width direction is formed to be higher than a protruding portion on the inner side in the vehicle width direction, the strength of the protruding portion on the outer side in the vehicle width direction is increased, and when an occupant moves to the outer side in the vehicle width direction during a vehicle collision or the like, the pelvis of the occupant can be reliably pressed by the protruding portion on the outer side in the vehicle width direction.

According to the vehicle body structure of the present embodiment, a movement of an occupant with respect to the vehicle body during a vehicle collision or the like can be restrained without impairing the riding comfort of the occupant.

The invention claimed is:

1. A vehicle body structure provided on a vehicle, the vehicle body structure comprising:
 a floor pan including an upper surface on which a cushion of a seat on which an occupant of the vehicle is to be seated is disposed, an upper surface of the cushion including a seating surface that is formed to be lower than other portions of the upper surface and on which the occupant is to be seated, the upper surface of the floor pan being directly contact with a bottom surface of the cushion in an area overlapping the seating surface when viewed from above; and a bracket disposed in a region on the upper surface of the floor pan that overlaps the seating surface when viewed from above and outside of a center of the seating surface in a vehicle width direction, the bracket comprising at least one protruding portion protruding upward and extending in a front-rear direction.

2. The vehicle body structure according to claim 1, wherein the at least one protruding portion is formed so as to have a width that increases rearward.

3. The vehicle body structure according to claim 1, wherein the at least one protruding portion comprises a plurality of protruding portions, the protruding portions including adjacent protruding portions that are adjacent in the vehicle width direction.

4. The vehicle body structure according to claim 2, wherein the at least one protruding portion comprises a plurality of protruding portions, the protruding portions including adjacent protruding portions which are adjacent in the vehicle width direction.

5. The vehicle body structure according to claim 3, wherein the bracket comprises at least one connecting portion connecting the adjacent protruding portions, the at least one connecting portion being formed between the adjacent protruding portions so as to be continuous with the adjacent protruding portions.

6. The vehicle body structure according to claim 4, wherein the bracket comprises at least one connecting portion connecting the adjacent protruding portions, the at least one connecting portion being formed between the adjacent protruding portions so as to be continuous with the adjacent protruding portions.

7. The vehicle body structure according to claim 3, wherein the protruding portions are formed such that a more outward in the vehicle width direction the protruding portions are, a larger an upward protrusion amount thereof is.

8. The vehicle body structure according to claim 4, wherein the protruding portions are formed such that a more outward in the vehicle width direction the protruding portions are, a larger an upward protrusion amount thereof is.

9. The vehicle body structure according to claim 5, wherein the protruding portions are formed such that a more outward in the vehicle width direction the protruding portions are, a larger an upward protrusion amount thereof is.

10. The vehicle body structure according to claim 6, wherein the protruding portions are formed such that a more outward in the vehicle width direction the protruding portions are, a larger an upward protrusion amount thereof is.

11. The vehicle body structure according to claim 1, wherein the at least one protruding portion comprise a first protruding portion and a second protruding portion, the second protruding portion disposed on outside of the first protruding portion in the vehicle width direction, and wherein a top surface of the first protruding portion and a top surface of the second protruding portion are directly contact with the bottom surface of the cushion.

12. The vehicle body structure according to claim 11, wherein the second protruding portion is formed so as to have a width that increases rearward.

13. The vehicle body structure according to claim 12, wherein strength of the second protruding portion increases toward a rear end thereof.

14. The vehicle body structure according to claim 11, wherein a front end of the first protruding portion is located forward of a front end of the second protruding portion.

15. The vehicle body structure according to claim 14, wherein the bracket comprises a connecting portion connecting a front end of the second protruding portion and a predetermined position of the first protruding portion in a front-rear direction.

16. The vehicle body structure according to claim 11, wherein the top surface of the second protruding portion is located above the top surface of the first protruding portion.

17. The vehicle body structure according to claim 11, further comprising a cover member disposed on the upper surface of the floor pan such as the cover member closes an opening formed in the floor pan, the cover member overlapping the seating surface when viewed from above, wherein the bracket is disposed on an outer side of the cover member in the vehicle width direction.

\* \* \* \* \*